United States Patent
Dumont et al.

(10) Patent No.: US 10,147,934 B2
(45) Date of Patent: Dec. 4, 2018

(54) POSITIVE ELECTRODE FOR LITHIUM ACCUMULATOR

(71) Applicant: SAFT, Bagnolet (FR)

(72) Inventors: Erwan Dumont, Ambares et Lagrave (FR); Philippe Borel, Bruges (FR); Yannick Toret, Bordeaux (FR)

(73) Assignee: SAFT, Bagnolet (FR)

( * ) Notice: Subject to any disclaimer, the term of this patent is extended or adjusted under 35 U.S.C. 154(b) by 399 days.

(21) Appl. No.: 14/655,198

(22) PCT Filed: Dec. 13, 2013

(86) PCT No.: PCT/EP2013/076521
§ 371 (c)(1),
(2) Date: Jun. 24, 2015

(87) PCT Pub. No.: WO2014/102071
PCT Pub. Date: Jul. 3, 2014

(65) Prior Publication Data
US 2015/0349334 A1    Dec. 3, 2015

(30) Foreign Application Priority Data
Dec. 26, 2012  (FR) ...................... 12 62771

(51) Int. Cl.
*H01M 4/36* (2006.01)
*H01M 4/58* (2010.01)
(Continued)

(52) U.S. Cl.
CPC ......... *H01M 4/131* (2013.01); *H01M 4/0435* (2013.01); *H01M 4/136* (2013.01);
(Continued)

(58) Field of Classification Search
CPC ...... H01M 4/131; H01M 4/136; H01M 4/364; H01M 4/366; H01M 4/0435; H01M 4/252;
(Continued)

(56) References Cited

U.S. PATENT DOCUMENTS

2006/0019151 A1* 1/2006 Imachi ............... H01M 2/0275
                                                429/128
2006/0099495 A1* 5/2006 Suzuki ................ H01M 2/021
                                                429/128
(Continued)

FOREIGN PATENT DOCUMENTS

CA    2 535 064 A1    8/2007
EP    1 619 733 A1    1/2006

OTHER PUBLICATIONS

International Search Report of PCT/EP2013/076521 dated Feb. 4, 2014 [PCT/ISA/210].

*Primary Examiner* — Osei K Amponsah
(74) *Attorney, Agent, or Firm* — Sughrue Mion, PLLC (57) ABSTRACT

A lithium accumulator including: a current collector; a stack of at least two layers arranged on at least one surface of the current collector, wherein a first layer is in contact with the surface of the current collector and includes a mixture of at least two compounds selected from a lithiated manganese phosphate, a lithiated transition metal oxide, and a lithiated spinel-type manganese oxide; and an outer layer including an active material having at least 90% of a lithiated iron phosphate.

18 Claims, 7 Drawing Sheets

(51) Int. Cl.
  *H01M 4/136* (2010.01)
  *H01M 10/0525* (2010.01)
  *H01M 4/04* (2006.01)
  *H01M 4/131* (2010.01)
  *H01M 4/525* (2010.01)
  *H01M 4/505* (2010.01)

(52) U.S. Cl.
  CPC ........... *H01M 4/364* (2013.01); *H01M 4/366* (2013.01); *H01M 4/505* (2013.01); *H01M 4/525* (2013.01); *H01M 4/5825* (2013.01); *H01M 4/0404* (2013.01); *H01M 10/0525* (2013.01)

(58) Field of Classification Search
  CPC .. H01M 4/5825; H01M 4/0404; H01M 4/505; H01M 10/0525
  USPC ....................................... 429/220–221, 126.1
  See application file for complete search history.

(56) References Cited

U.S. PATENT DOCUMENTS

2007/0015058 A1\* 1/2007 Takezawa ............... H01M 4/13
  429/231.95
2009/0253043 A1\* 10/2009 Bak ..................... H01M 2/1686
  429/246
2009/0301866 A1\* 12/2009 Zaghib ................ H01M 4/0404
  204/242

\* cited by examiner

POSITIVE ELECTRODE FOR LITHIUM ACCUMULATOR

CROSS REFERENCE TO RELATED APPLICATIONS

This application is a National Stage of International Application No. PCT/EP2013/076521, filed Dec. 13, 2013, claiming priority based on French Patent Application No. 1262771, filed Dec. 26, 2012, the contents of all of which are incorporated herein by reference in their entirety.

TECHNICAL FIELD

The technical field of the invention is that of active materials for use in the positive electrode (or cathode) of a rechargeable lithium electrochemical cell (or secondary cell).

PRIOR ART

In a secondary cell, an active material is a material which participates in the electrochemical reactions to produce electrical energy when the secondary cell discharges. The use of transition metal oxides that contain lithium as the cathode active material in lithium secondary cells is known. For the positive electrode, most frequently an active material of lithium-containing oxides of transition metals of general formula $LiMO_2$ is used, in which M represents at least one transition metal such as Mn, Ni, Co or a mixture thereof. These active materials are used to achieve high performance, particularly in terms of reversible capacity under cycling and lifespan. For example, $LiCoO_2$ and $LiNiO_2$ respectively have a capacity of approximately 180 and 220 mAh/g. $LiCoO_2$ however has two major drawbacks—its toxicity and its high cost.

It is also known to use a lithium-containing manganese oxide belonging to the family of spinels and having the formula $LiMn_2O_4$. This compound benefits from low cost and absence of toxicity, but has a reduced capacity (110 mAh/g) and a short lifespan that comes from the significant dissolution of the oxide in the electrolyte of the secondary cell.

Other active materials of lower cost than $LiCoO_2$ and having good thermal stability and lack of toxicity have been studied including lithium-containing phosphates of at least one transition metal, such as $LiFePO_4$ and $LiMnPO_4$.

Use of $LiFePO_4$ and $LiMnPO_4$ is however confronted by their low electron conductivity. It is usually necessary to add a high proportion of an electron conductive material in the electrode in order to obtain a secondary cell with good discharge performance at a high current. Moreover, $LiFePO_4$ and $LiMnPO_4$ exhibit poor durability when used as positive electrode materials in conjunction with a graphite negative electrode in a secondary cell operated in cycling.

Research has been conducted to obtain a lithium cell that offers high capacity, high thermal stability, increased user safety and good performance when the cell is used in cycling conditions.

As examples, we can cite EP-A-2,269,954 which teaches using as a cathode active material a mixture comprising at least 90% of $LiFePO_4$ with less than 10% of a lithium-containing oxide of nickel, cobalt and aluminum. Such an active material has good thermal stability and good cycling stability.

We can also cite EP-A-1,724,860 which teaches using as a cathode active material a mixture comprising a lithium-containing manganese oxide of the $LiMn_2O_4$ spinel type with a lithium-containing manganese phosphate of the $LiMnPO_4$ type. It is said that such an active material makes it possible to manufacture a lithium cell with a high voltage and capacity, high operating reliability and a long lifespan in cycling.

There is nevertheless a need to provide a secondary cell having further improved lifetime under cycling, particularly with regard to the lifespan of a secondary cell such as that described in EP-A-1,724,860.

SUMMARY OF THE INVENTION

To this end, the present invention provides an electrode comprising:
a) a current collector (4);
b) a stack of at least two layers (1, 2, 3) disposed on at least one face of the current collector, in which:
α) a first layer (1) is in contact with the face of the current collector and comprises a mixture of at least two compounds chosen from:
a compound i) of formula $Li_xMn_{1-y-z}M'_yM''_zPO_4$ abbreviated to LMP, where M' and M'' are selected from the group consisting of B, Mg, Al, Si, Ca, Ti, V, Cr, Fe, Co, Ni, Cu, Zn, Y, Zr, Nb and Mo; M' and M'' being different from each other; and $0.8 \le x \le 1.2$, $0 \le y \le 0.6$, $0 \le z \le 0.2$;
a compound ii) of formula $Li_xM_{2-x-y-z-w}M'_yM''_zM'''_wO_2$ abbreviated to LMO2, where M, M', M'' and M''' are selected from the group consisting of B, Mg, Al, Si, Ca, Ti, V, Cr, Mn, Fe, Co, Ni, Cu, Zn, Y, Zr, Nb and Mo, provided that at least M or M' or M'' or M''' is selected from Mn, Co, Ni, or Fe; M, M', M'' and M''' being different from each other; and $0.8 \le x \le 1.4$; $0 \le y \le 0.5$; $0 \le z \le 0.5$; $0 \le w \le 0.2$ and $x+y+z+w<2$;
a compound iii) of formula $Li_xMn_{2-y-z}M'_yM''_zO_4$ abbreviated to LMO, where M' and M'' are selected from the group consisting of B, Mg, Al, Si, Ca, Ti, V, Cr, Fe, Co, Ni, Cu, Zn, Y, Zr, Nb and Mo; M' and M'' being different from each other; and $1 \le x \le 1.4$; $0 \le y \le 0.6$, $0 \le z \le 0.2$;
β) an outer layer (2) comprising an active material comprising at least 90% of a compound of formula $Li_xFe_{1-y}M_yPO_4$ abbreviated to LFP, in which M is selected from the group consisting of B, Mg, Al, Si, Ca, Ti, V, Cr, Mn, Co, Ni, Cu, Zn, Y, Zr, Nb and Mo; and $0.8 \le x \le 1.2$; $0 \le y \le 0.6$.

According to preferred embodiments, the invention can comprise one or more of the following features:

According to one embodiment, said mixture comprises compound i) (LMP). The weight percentage of compound i) may be between 10% and 90% of the weight of the first layer.

In one embodiment, the weight percentage of compound i) is between 10% and 30% of the weight of the first layer, preferably between 15% and 25% of the weight of the first layer.

According to one embodiment, the electrode comprises between the first and the outer layer, at least one intermediate layer (3) comprising at least one compound selected from the compounds i), ii) and iii). The intermediate layer may comprise a mixture of at least two compounds selected from the compounds i), ii) and iii).

According to one embodiment, the first layer comprises a mixture of compounds i) and iii). The weight percentage of compound i) may be between 10% and 90% and the weight percentage of compound iii) may be between 90% and 10% of the weight of the first layer. The weight percentage of compound i) may also be between 10% and 30%, and the weight percentage of compound iii) may be between 90% and 70% of the weight of the first layer.

According to one embodiment, M' or M" of compound i) is Fe. Subscripts y and z of M' and M" in compound i) may be less than 0.40.

According to one embodiment, M' or M" of compound iii) is Al. Subscripts y and z of M' and M" in compound iii) may be less than 0.10.

According to one embodiment, the first layer comprises a mixture of the compounds ii) and iii). The weight percentage of compound ii) can be between 10% and 90% and the weight percentage of compound iii) may be between 90% and 10% of the weight of the first layer.

According to one embodiment, the first layer comprises a mixture of compounds i) and ii). The weight percentage of compound i) may be between 10% and 90% and the weight percentage of compound ii) may be between 90% and 10% of the weight of the first layer.

According to one embodiment, the first layer comprises a mixture of compounds i), ii) and iii).

According to one embodiment, the percentage by weight of the outer layer is less than 20% by weight of that of the first layer, preferably less than 10%, more preferably less than 5%.

According to one embodiment, each face of the current collector is covered with a stack of said at least two layers.

The invention also provides a lithium secondary cell comprising:
  at least one positive electrode which is an electrode as described above;
  at least a negative electrode comprising a material capable of intercalating and de-intercalating lithium into/from its structure.

The invention also provides a method of manufacturing an electrode comprising:
  a) providing a current collector;
  b) depositing onto at least one face of the current collector at least two layers (1, 2, 3);
  a) a first layer (1) being in contact with the face of the current collector and comprising a mixture of at least two compounds chosen from:
    a compound i) of formula $Li_xMn_{1-y-z}M'_yM''_zPO_4$ (LMP) where M' and M" are selected from the group consisting of B, Mg, Al, Si, Ca, Ti, V, Cr, Fe, Co, Ni, Cu, Zn, Y, Zr, Nb and Mo; M' and M" being different from each other; and $0.8 \leq x \leq 1.2$, $0 \leq y \leq 0.6$, $0 \leq z \leq 0.2$;
    a compound ii) of formula $Li_xM_{2-x-y-z-w}M'_yM''_zM'''_wO_2$ (LMO2) where M, M', M" and M''' are selected from the group consisting of B, Mg, Al, Si, Ca, Ti, V, Cr, Mn, Fe, Co, Ni, Cu, Zn, Y, Zr, Nb and Mo, provided that at least M or M' or M" or M''' is selected from Mn, Co, Ni, or Fe; M, M', M" and M''' being different from each other; and $0.8 \leq x \leq 1.4$; $0 \leq y \leq 0.5$; $0 \leq z \leq 0.5$; $0 \leq w \leq 0.2$ and $x+y+z+w<2$;
    a compound iii) of formula $Li_xMn_{2-y-z}M'_yM''_zO_4$ (LMO) where M' and M" are selected from the group consisting of B, Mg, Al, Si, Ca, Ti, V, Cr, Fe, Co, Ni, Cu, Zn, Y, Zr, Nb and Mo, M' and M" being different from each other; and $1 \leq x \leq 1.4$; $0 \leq y \leq 0.6$; $0 \leq z \leq 0.2$;
  β) an outer layer (2) comprising an active material comprising at least 90% of a compound of formula $Li_xFe_{1-y}M_yPO_4$ (LFP) in which M is selected from the group consisting of B, Mg, Al, Si, Ca, Ti, V, Cr, Mn, Co, Ni, Cu, Zn, Y, Zr, Nb and Mo; and $0.8 \leq x \leq 1.2$; $0 \leq y \leq 0.6$.

Obviously, the present invention is not limited to the examples and embodiments described and depicted but is capable of numerous variants accessible to persons skilled in the art.

DETAILED DESCRIPTION OF EMBODIMENTS

The structure of the positive electrode according to the invention will now be described.

Compound i) has the formula $Li_xMn_{1-y-z}M'_yM''_zPO_4$ (LMP), where M' and M" being different from one another and are selected from the group consisting of B, Mg, Al, Si, Ca, Ti, V, Cr, Fe, Co, Ni, Cu, Zn, Y, Zr, Nb and Mo, with $0.8 \leq x \leq 1.2$; $0 \leq y \leq 0.6$; $0 \leq z \leq 0.2$. One example of this compound is $LiMnPO_4$.

Compound i) may have one or more of the following characteristics:
M' or M" is Fe;
x=1;
y and/or z are less than 0.40.

In one embodiment, y and/or z are less than 0.25.

Compound ii) has the formula $Li_xM_{2-x-y-z-w}M'_yM''_zM'''_wO_2$ (LMO2), where M, M', M" and M''' are selected from the group consisting of B, Mg, Al, Si, Ca, Ti, V, Cr, Mn, Fe, Co, Ni, Cu, Zn, Y, Zr, Nb and Mo, provided that M or M' or M" or M''' is selected from Mn, Co, Ni, or Fe; M, M', M" and M''' being different from each other; with $0.8 \leq x \leq 1.4$; $0 \leq y \leq 0.5$; $0 \leq z \leq 0.5$; $0 \leq w \leq 0.2$ and x+y+z+w<2. Examples of this compound are $LiNi_{1/3}Co_{1/3}Mn_{1/3}O_2$, $LiNi_{0.8}Co_{0.15}Al_{0.05}O_2$, $LiNi_{0.3}Mn_{0.5}Co_{0.15}Al_{0.05}O_2$ and $Li_{1.4}Mn_{0.4}Ni_{0.1}Co_{0.1}O_2$ in which Co, Ni and Mn may be partially substituted with one or more transition metals.

Compound iii) has the formula $Li_xMn_{2-y-z}M'_yM''_zO_4$ (LMO), where M' and M" are selected from the group consisting of B, Mg, Al, Si, Ca, Ti, V, Cr, Fe, Co, Ni, Cu, Zn, Y, Zr, Nb and Mo; M' and M" are different from each other, and $1 \leq x \leq 1.4$; $0 \leq y \leq 0.6$; $0 \leq z \leq 0.2$. One example of this compound is the spinel $LiMn_2O_4$.

Compound iii) may have one or more of the following characteristics:
M' or M" is Al;
x=1;
y and/or z are less than 0.10.

The compound of formula $Li_xFe_{1-y}M_yPO_4$ (LFP), where M is selected from the group consisting of B, Mg, Al, Si, Ca, Ti, V, Cr, Mn, Co, Ni, Cu, Zn, Y, Zr, Nb and Mo; and $0.8 \leq x \leq 1.2$; $0 \leq y \leq 0.6$. One example of this compound is $LiFePO_4$.

A stack of layers is created on at least one side of the current collector, the stack being characterized in that the deposition of the first layer, that is to say the one in direct contact with the surface of the current collector, comprises a mixture of two compounds selected from LMO2, LMP and LMO and in that the last layer deposited, that is to say the one furthest from the current collector comprises essentially LFP as the active material, that is to say at least 90% by weight of LFP. The layer furthest from the current collector will be referred to below as the outer layer. The active material of the last layer preferably comprises at least 95% by weight of LFP, more preferably at least 99% by weight of LFP.

In a preferred embodiment, the first layer comprises compound i) (LMP).

Figure 1:
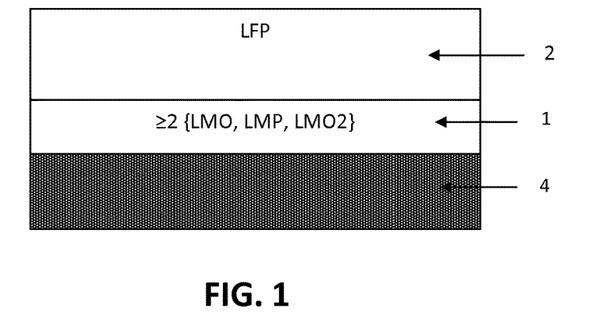
FIG. 1 shows a diagrammatic section through an electrode according to the invention.

FIG. 1 shows diagrammatically the structure of such an electrode according to an embodiment of the invention. This structure shows from bottom to top:
a current collector (4);
a stack of two layers (1, 2) arranged on one face of the current collector.

Layer 1 is in direct contact with the upper face of the current collector. It comprises a mixture of at least two compounds selected from LMO, LMP and LMO2. Layer 2 forms an outer layer and comprises an LFP type compound. When layer 1 comprises a mixture of two active materials, this mixture comprises, based on the total weight of active materials, preferably between 10 and 90% of one of the two active materials and 90 to 10% of the other active material. The thicknesses of the layers 1 and 2 may be identical or different. In FIG. 1, the stacking of the layers is carried out only on the upper face of the current collector. Nevertheless, it will be understood that the invention is not limited to the deposition of a stack on only one of the two faces of the current collector but that the stacking of layers may be performed on both faces of the current collector.

Figure 2:
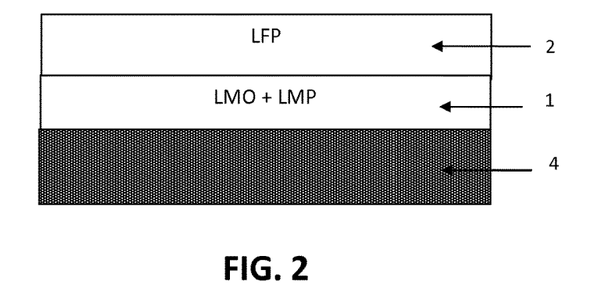
FIG. 2 shows a diagrammatic section through an electrode according to a first embodiment of the invention.

FIG. 2 shows a first embodiment in which layer 1 comprises a mixture of LMO and LMP. Preferably, layer 1 comprises, based on the total weight of active materials, from 70 to 90% of LMO and from 30 to 10% of LMP.

Figure 3:
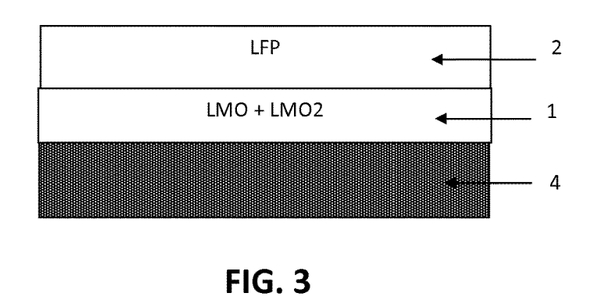
FIG. 3 shows a diagrammatic section through an electrode according to a second embodiment of the invention.

In a second embodiment illustrated in FIG. 3, the first layer 1 comprises a mixture of LMO and LMO2.

Figure 4:
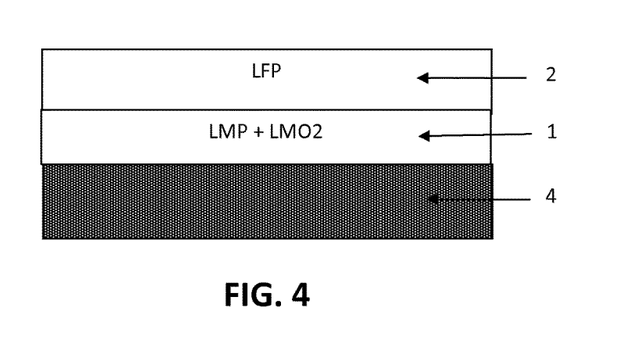
FIG. 4 shows a diagrammatic section through an electrode according to a third embodiment of the invention.

In a third embodiment illustrated in FIG. 4, the first layer 1 comprises a mixture of LMP and LMO2.

Figure 5:
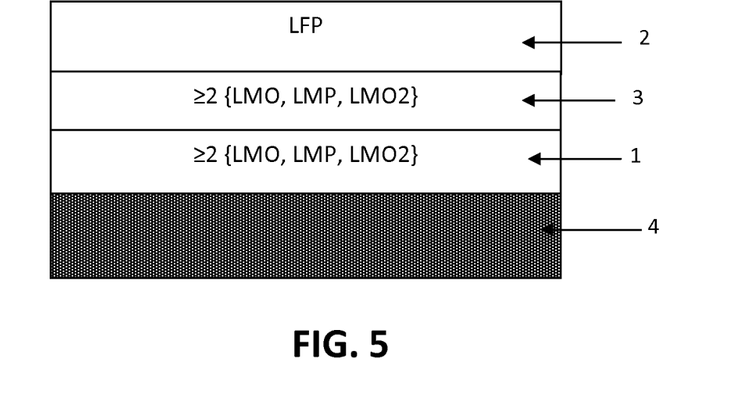
FIG. 5 shows a diagrammatic section through an electrode according to a fourth embodiment of the invention.

It is possible to deposit between the first layer 1 and the outer layer 2, one or more intermediate layers 3; each intermediate layer generally comprises at least one compound selected from the compounds LMO2, LMP and LMO. In a fourth embodiment, an intermediate layer comprises at least two compounds selected from LMO2, LMP and LMO, as shown in FIG. 5. The electrode shown in FIG. 5 comprises, from the bottom up:
a current collector (4);
a stack of three layers (1, 2, 3) arranged on one face of the current collector.

Layer 1 is in direct contact with the upper face of the current collector. It comprises a mixture of at least two compounds selected from LMO, LMP and LMO2. Layer 3 lies on layer 1 and comprises a mixture of at least two compounds selected from LMO, LMP and LMO2, the compounds of layer 3 being different from those of layer 1. Layer 2 lies on layer 3. Layer 2 forms an outer layer and comprises as active material, essentially LFP.

Figure 6:
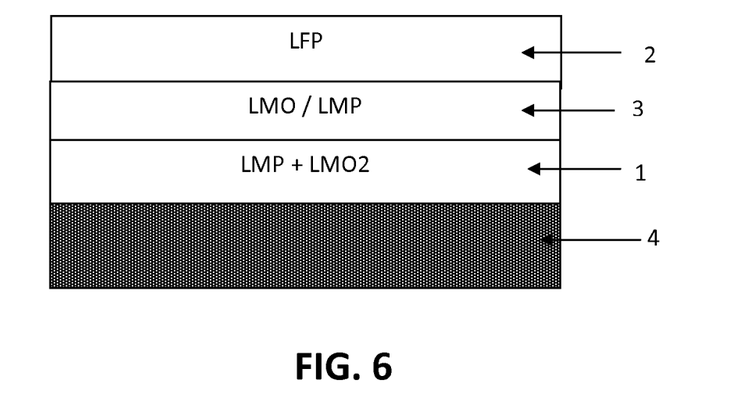
FIG. 6 shows a diagrammatic section through an electrode according to a fifth embodiment of the invention.

In a fifth embodiment shown in FIG. 6, layer 1 comprises a mixture of LMP and LMO2; layer 3 comprises LMO or LMP and layer 2 forms an outer layer and comprises as active material essentially LFP.

The number of intermediate layers disposed between the first layer and the outer layer is not limited. One, two, three or more layers can be deposited before depositing the outer layer. In the case where a stack of layers is deposited on each side of the current collector, the two stacks are generally comprised of the same layers. It is also conceivable for the thicknesses of the layers of the stack on one side to be different from the thicknesses of the layers of the stack on the opposite side.

According to the invention, the deposition of a layer is carried out either directly on the current collector for the first layer or on an underlying layer already formed for the intermediate layers and the outer layer. The term "depositing a layer" should not be understood here as corresponding to a coating of particles of one compound with a layer of a different compound, such as when particles of an active material are coated with a carbon layer so as to make them more conducting. Such a coating is generally carried out during the synthesis of the active material while in the present invention, depositing a layer is performed on a previously formed underlying layer.

We shall now describe the method of depositing successive layers on at least one side of the current collector. The stack of layers is obtained by depositing one layer after the other. The deposition of each layer may be performed using a coating process. In this process a paste is prepared by mixing the active material(s) generally with a binder, an electron-conductive compound and an organic solvent. The paste is deposited on a metal foil serving as a current collector. Depositing the paste can be done either on one side of the current collector only or simultaneously on both sides of the current collector. One then obtains an electrode which is dried to evaporate the solvent. The electrode can then be compressed during a calendering step which consists in passing the electrode between two rollers. The calendering step makes it possible to adjust the thickness of the deposited layer. For the deposition of subsequent layers, the steps of preparing a paste, depositing the paste, drying and calendering are repeated. The depositing of each layer requires the preparation of a paste of a given composition. The deposited layers have a thickness after calendering generally comprised between 25 µm and 300 µm. The thickness of the outer layer is preferably between 5% and 30% of the thickness of the first layer.

The weight of the one or more active material (s) generally constitutes from 80 to 96% by weight of the weight of the paste.

The binder and the electron-conducting compound each typically make up 2 to 10% by weight of the weight of the paste.

The current collector is preferably a two-dimensional conductive support such as a solid or perforated strip, made of carbon or metal, such as nickel, steel, stainless steel or aluminum. Generally, the current collector of the positive electrode is aluminum and its thickness is between 6 and 35 µm.

The binder has the function of strengthening the cohesion between the active material particles as well as of improving the adhesion of the paste to the current collector. The binder may contain one or more of the following: polyvinylidene fluoride (PVDF) and its copolymers, polytetrafluoroethylene (PTFE), polyacrylonitrile (PAN), poly(methyl)- or (butyl)-methacrylate, polyvinyl chloride (PVC), polyvinyl formal, polyester and polyether block amides, polymers of acrylic acid, methacrylic acid, acrylamide, itaconic acid, sulfonic acid, elastomers and cellulose compounds.

Among the elastomers which can be used, we can cite ethylene/propylene/diene (EPDM) terpolymers, styrene/butadiene copolymers (SBR), acrylonitrile/butadiene (NBR) copolymers, styrene/butadiene/styrene (SBS) or styrene/acrylonitrile/styrene (SIS) block copolymers, styrene/ethylene/butylene/styrene (SEBS) copolymers, styrene/butadiene/vinylpyridine (SBVR) terpolymers, polyurethanes (PU), neoprenes, polyisobutylenes (PIB), butyl rubbers and mixtures thereof.

The cellulose compound may be a carboxymethylcellulose (CMC), a hydroxypropylmethylcellulose (HPMC), a hydroxypropylcellulose (HPC) or a hydroxyethylcellulose (HEC).

The electron-conductive additive is generally selected from graphite, carbon black, acetylene black, soot or a mixture thereof.

The present invention further relates to a lithium secondary cell comprising a positive electrode as described above. The secondary cell of the invention further comprises at least one negative electrode, at least one separator and an electrolyte which will now be described.

The negative electrode is prepared in a conventional manner. It consists of a conductive support serving as a current collector that is coated with a layer containing the active material and further comprising a binder and a conductive material. The active material is capable of intercalating lithium in its structure. It can be selected from lithium compounds, a carbonaceous material capable of intercalating lithium in its structure such as graphite, coke, carbon black and vitreous carbon, and a mixed oxide of lithium and a transition metal, such as nickel, cobalt or titanium. It may also contain tin, silicon, carbon- and silicon-based compounds, carbon- and tin-based compounds and carbon- tin- and silicon-based compounds, and an oxide of titanium such as $Li_4Ti_5O_{12}$. It can include silicon the surface of which is grafted with an organic group as described in European Patent application EP-A-2 242 129. It may comprise a Si/C nanocomposite material as described in French Patent application FR-A-2,885,734. The anodes can also be made of transition metal oxides, nitrides or phosphide.

The electrolyte is selected from a non-aqueous liquid electrolyte comprising a lithium salt dissolved in a solvent and a solid polymer ion conducting for lithium ions electrolyte, such as polyethylene oxide (PEO).

The lithium salt is selected from lithium perchlorate $LiClO_4$, lithium hexafluorophosphate $LiPF_6$, lithium tetrafluoroborate $LiBF_4$, lithium trifluoromethanesulfonate $LiCF_3SO_3$, lithium bis(fluorosulfonyl)imide $Li(FSO_2)_2N$ (LiFSI), lithium trifluoromethanesulfonimide $LiN(CF_3SO_2)_2$ (LiTFSI), lithium trifluoromethanesulfonemethide $LiC(CF_3SO_2)_3$ (LiTFSM), lithium bisperfluoroéthylsulfonimide $LiN(C_2F_5SO_2)_2$ (LiBETI), lithium 4,5-dicyano-2-(trifluoromethyl)imidazolide (LiTDI), lithium bis (oxalatoborate) (LiBOB), lithium tris(pentafluoroethyl) trifluorophosphate $LiPF_3(CF_2CF_3)_3$ (LiFAP) and mixtures of the foregoing.

Preferably the solvent is one or a mixture of solvents selected from conventional organic solvents, in particular saturated cyclic carbonates, unsaturated cyclic carbonates and non-cyclic carbonates, alkyl esters, such as formates, acetates, propionates or butyrates, ethers, lactones such as gamma-butyrolactone, tetrahydrothiofene dioxide, nitrile solvents, and mixtures thereof. Of the saturated cyclic carbonates, mention may be made of, for example, ethylene carbonate (EC), fluoroethylene carbonate (FEC), propylene carbonate (PC), butylene carbonate (BC), and mixtures of the above. Among the unsaturated cyclic carbonates, mention may be made of, for example, vinylene carbonate (VC), its derivatives and mixtures thereof. Among non-cyclic carbonates, mention may, for example, be made of dimethyl carbonate (DMC), diethyl carbonate (DEC), ethyl methyl carbonate (EMC), dipropyl carbonate (DPC) and mixtures thereof. Among the alkyl esters we can for example mention methyl acetate, ethyl acetate, methyl propionate, ethyl propionate, butyl propionate, methyl butyrate, ethyl butyrate, propyl butyrate and mixtures thereof. Among the ethers we can for example mention dimethyl (DME) or diethyl (DEE) ether, and mixtures thereof.

The separator may consist of a layer of polypropylene (PP), polyethylene (PE), polytetrafluoroethylene (PTFE), polyacrylonitrile (PAN), polyethylene terephthalate (PET) or of a mixture of layers of different natures. The cited polymers can be coated with a ceramic layer.

EXAMPLES

The following examples show both that the deposition of an LFP layer on a layer of a mixture of LMO and LMP allows to significantly improve cycling lifespan of a secondary cell compared with a secondary cell the positive electrode of which comprises a layer of a mixture of LMO and LMP not coated with LFP They demonstrate, secondly, the existence of a synergistic effect between the mixture constituted of LMO and LMP and layer of LFP.

In the examples below, the positive electrode comprises a current collector support which is an aluminum foil 20 microns thick. The layers are deposited on the current collector by coating. Each deposited layer is formed from a paste comprising 91% of one or more active materials, 4% by weight of polyvinylidene fluoride (PVdF) based on the weight of the paste, 5% by weight of carbon black and graphite based on the weight of the paste. Where the electrode comprises an outer layer of LFP as in Examples D, E and F, the weight of LFP represents 10% by weight of the mixture of the active material(s) of the underlying layer.

The negative electrode comprises a current collector carrier which is a copper foil 12 microns thick. A paste consisting of a mixture of graphite particles, carboxymethyl cellulose and a butadiene-styrene polymer is deposited by coating on one side of the current collector. The weight of carboxymethyl cellulose and styrene-butadiene polymer mixture is about 3% of the weight of the paste.

The separator employed comprises polypropylene and polyethylene.

The electrolyte is a lithium salt dissolved in a solvent comprising propylene carbonate, dimethyl carbonate and ethylene carbonate.

Example 1) Effect of a Mixture of $LiMn_{1.92}Al_{0.08}O_4$ (LMO)+$LiFe_{0.2}Mn_{0.8}PO_4$ (LMP) on Cycling Lifespan Secondary cells having different positive electrodes outside the invention and the same graphite-based negative electrode were manufactured. Secondary cell A comprised a positive electrode in which the active material is $LiFe_{0.2}Mn_{0.8}PO_4$. Cell B comprised a positive electrode in which the active material was $LiMn_{1.92}Al_{0.08}O_4$. Cell C comprised a positive electrode in which the active material was a mixture consisting of 80% of $LiMn_{1.92}Al_{0.08}PO_4$ and 20% of $LiFe_{0.2}Mn_{0.8}PO_4$.

Secondary cells A, B and C were subjected to a cycling test at 40° C. comprising a succession of charging-discharging cycles of the cell. Charging was carried out at a current of C/(20) until a voltage of 4.2 V was reached. Discharge was carried out at a current of C/20.

Figure 7:
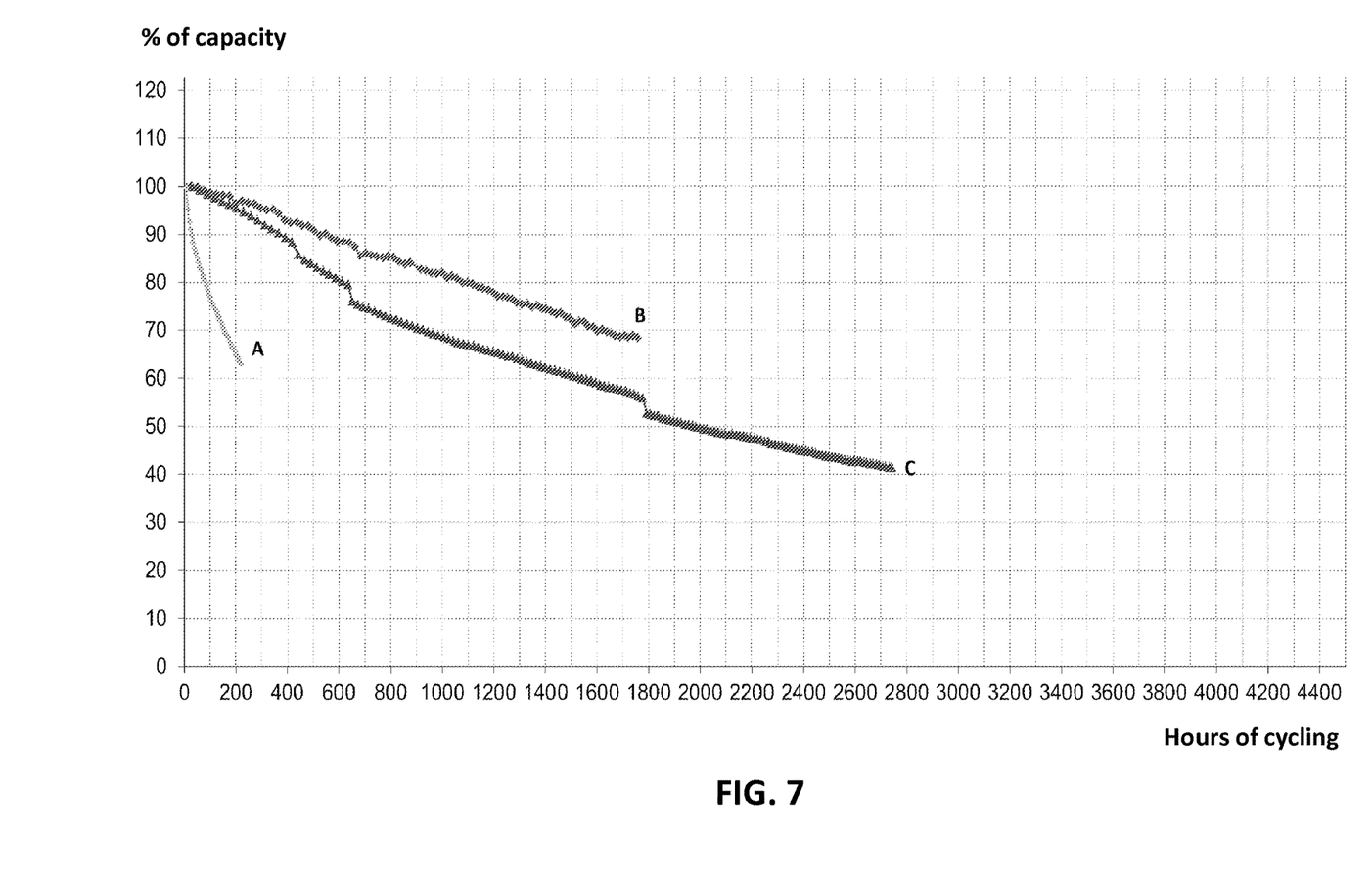
FIG. 7 shows the results of a cycling test at 40° C. of three different lithium secondary cells comprising positive electrodes which are not part of the invention and the same negative electrode based on graphite:
  A: positive electrode comprising a single layer in which the active material consists of LMP;
  B: positive electrode comprising a single layer in which the active material is LMO:
  C: positive electrode comprising a single layer in which the active material is a mixture of 80% of LMO and 20% LMP.

FIG. 7 shows the percentage of capacity restituted for each of the secondary cells according to the number of hours of cycling. This figure shows that the cell B, the positive electrode of which contained $LiMn_{1.92}Al_{0.08}PO_4$ had better cycling performance than cell A, the positive electrode of which contained $LiFe_{0.2}Mn_{0.8}PO_4$. Indeed, the loss of capacity of cell B is 30% after 1700 hours of cycling while the loss of capacity of cell A is also 30%, but after only 150 hours of cycling. Cell C showed a loss of capacity intermediate between that of cell A and cell B.

Example 2) Effect of the Presence of an Outer Layer of $LiFePO_4$ (LFP) on Cycling Lifespan Secondary cells having different positive electrodes outside the invention and the same graphite-based negative electrode were manufactured.

Secondary cells A and B are as described in Example 1.

Cell D differs from cell A in that layer comprising $LiFe_{0.2}Mn_{0.8}PO_4$ in contact with the current collector is covered by a layer comprising $LiFePO_4$.

Cell E differs from cell B in that layer comprising $LiMn_{1.92}Al_{0.08}O_4$ in contact with the current collector is covered by a layer comprising $LiFePO_4$.

Secondary cells D and E were subjected to a cycling test at 40° C. as described in Example 1 and the capacity restituted during cycling was compared with those restituted by cells A and B respectively.

Figure 8:
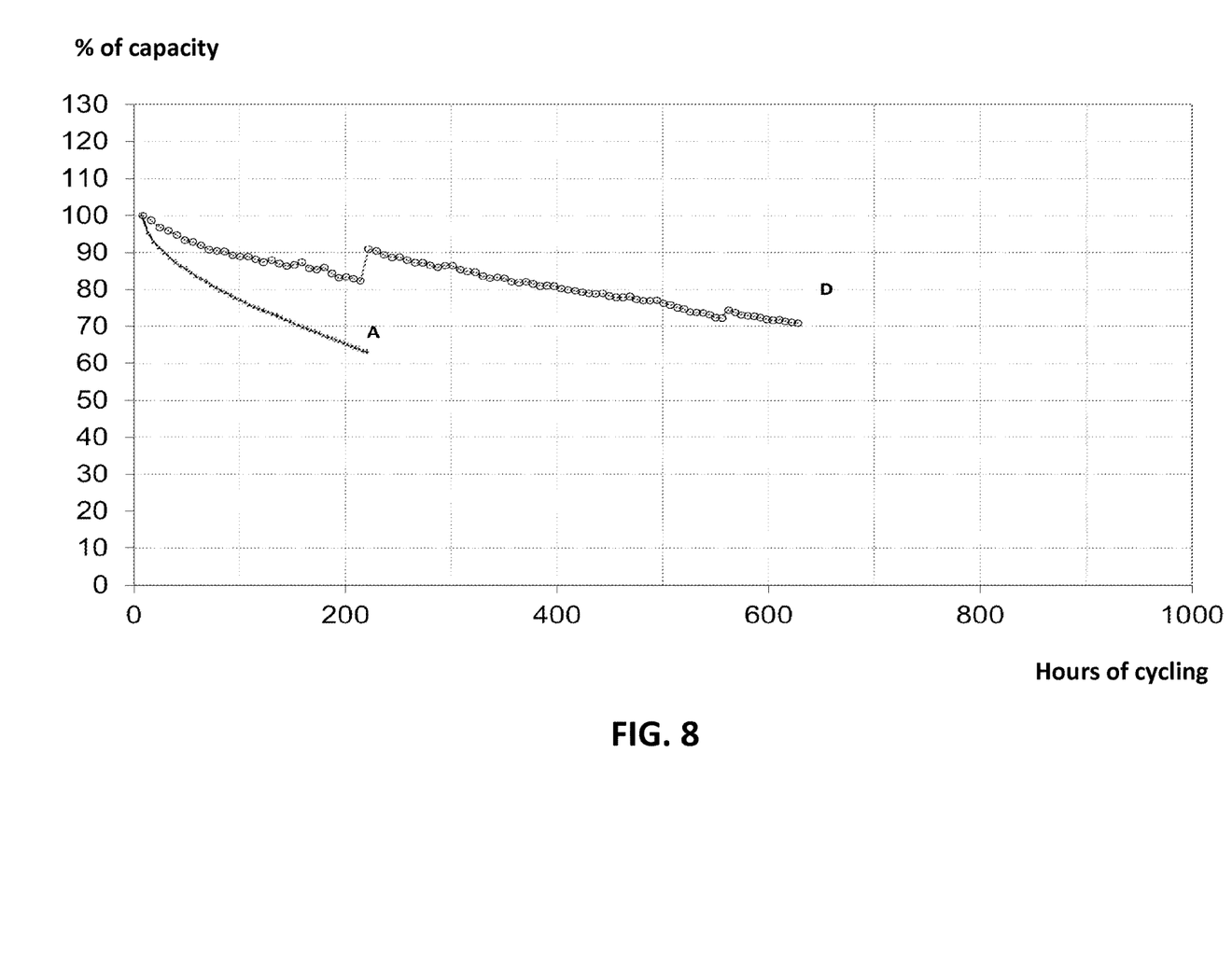
FIG. 8 shows the results of a cycling test at 40° C. of two lithium secondary cells comprising different positive electrodes not forming part of the invention and a same negative electrode based on graphite.
  A: positive electrode comprising a single layer in which the active material consists of LMP;
  D: positive electrode comprising a first layer in which the active material consists of LMP and an outer layer of LFP.

FIG. 8 shows the percentage of capacity restituted by secondary cells A and D according to the number of hours of cycling. This figure shows that the capacity restituted by cell D is greater than that restituted by cell A. Indeed, the loss of capacity of cell D was 30% after 600 hours of cycling while the loss of capacity of cell A was also 30% but after only 150 hours of cycling.

Figure 9:
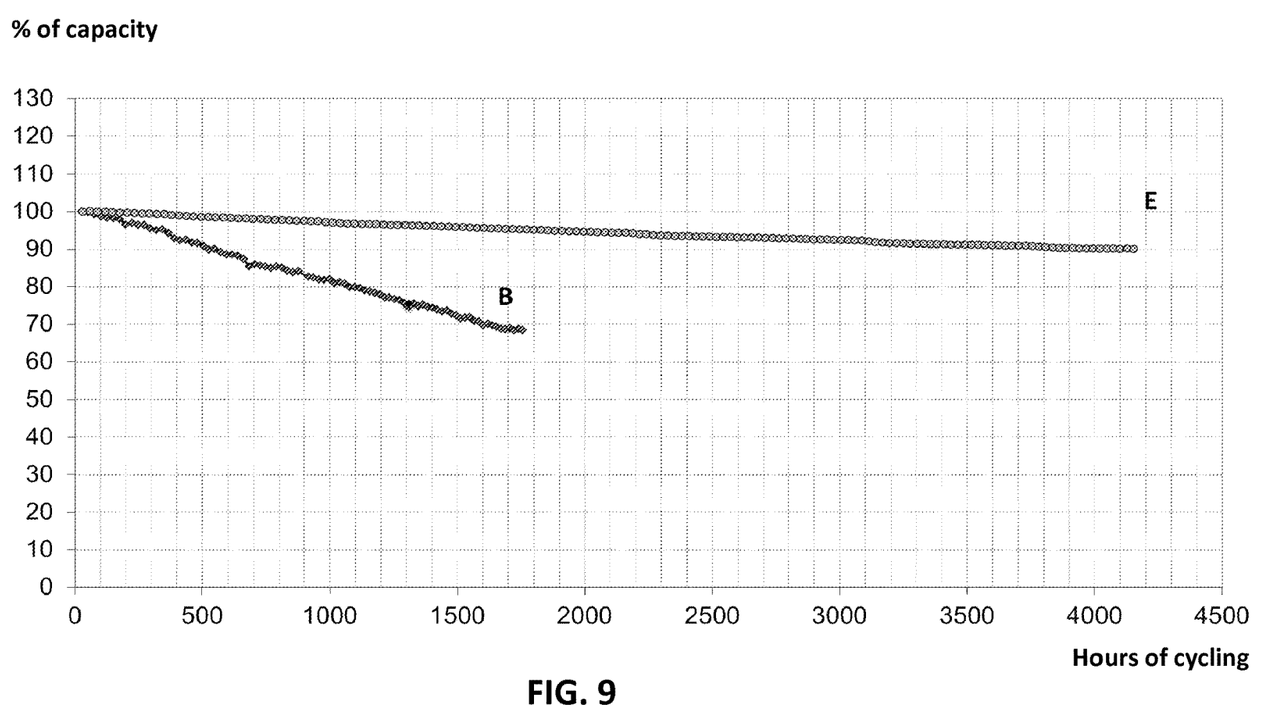
FIG. 9 shows the results of a cycling test at 40° C. of two lithium secondary cells comprising different positive electrodes not forming part of the invention and the same negative electrode based on graphite:
  B: positive electrode comprising a single layer in which the active material is LMO;
  E: positive electrode comprising a first layer in which the active material consists of LMO and an outer layer of LFP.

FIG. 9 shows the percentage of capacity restituted by secondary cells B and E according to the number of hours of cycling. This figure shows that the capacity restituted by cell E is greater than that restituted by cell B. Indeed, after 1700 hours of cycling, the capacity restituted by cell E is about 95% while that by cell B is only 70%.

This consequently demonstrates the beneficial effect on cycling lifespan provided by the presence of a layer of $LiFePO_4$.

Example 3) Synergistic Effect of the Mixture $LiFe_{0.2}Mn_{0.8}PO_4$ (LMP)+$LiMn_{1.92}Al_{0.08}O_4$ (LMO) on Cycling Lifespan Secondary cells having different positive electrodes and the same graphite-based negative electrode were manufactured.

Cell C is as described in Example 1.

Cell F has a positive electrode according to the invention. This differs from the one of cell C in that layer comprising a mixture of $LiFe_{0.2}Mn_{0.8}PO_4$ and $LiMn_{1.92}Al_{0.08}O_4$ in contact with the current collector is covered by a layer comprising $LiFePO_4$.

Figure 10:
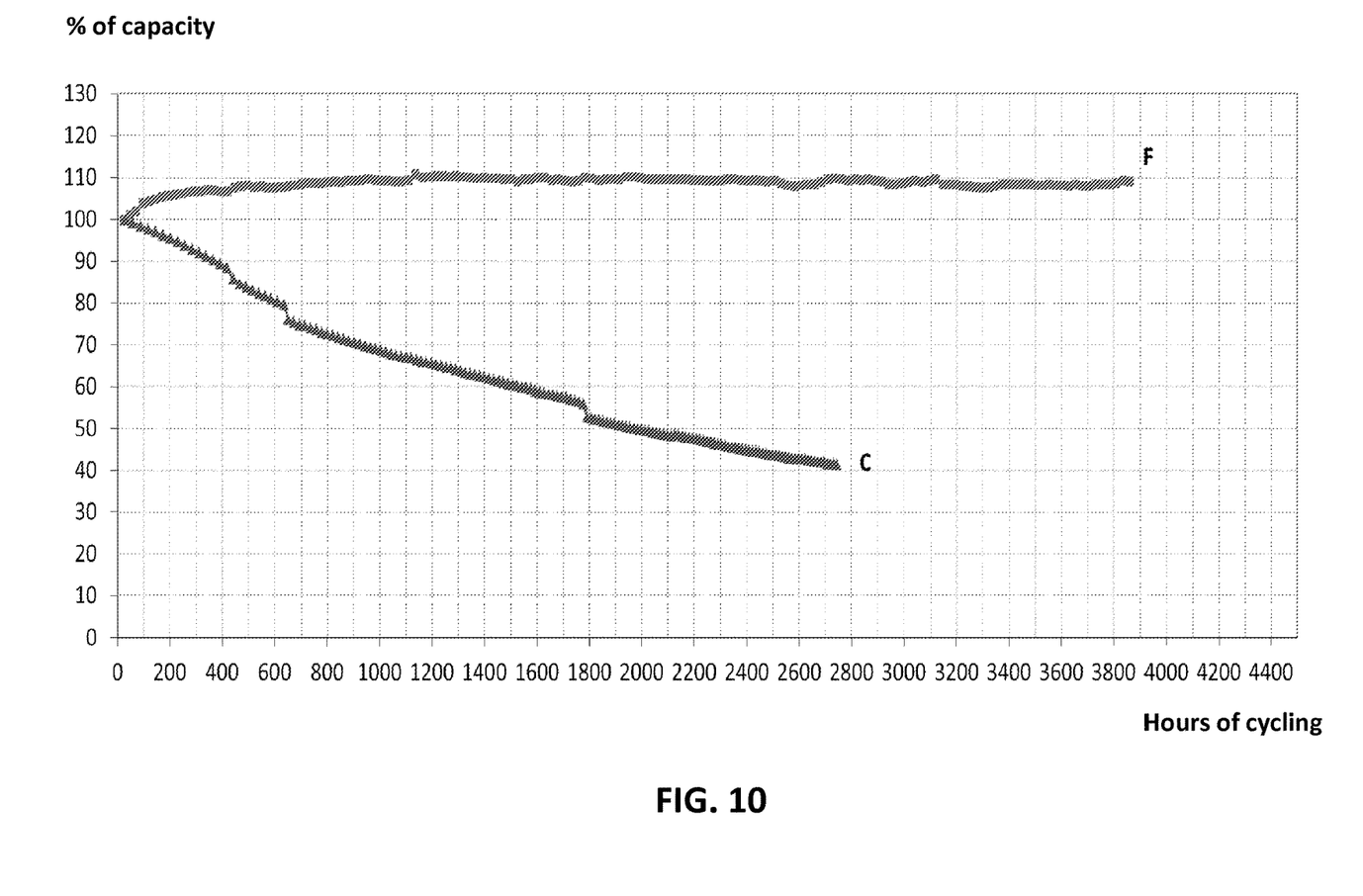
FIG. 10 shows the results of a cycling test at 40° C. of two lithium secondary cells comprising different positive electrodes and a same graphite-based negative electrode.
  C: positive electrode outside the invention comprising a single layer in which the active material is a mixture of 80% of LMO and 20% LMP;
  F: positive electrode according to the invention comprising a first layer in which the active material is a mixture of 80% of LMO % of LMO and 20% of LMP and an outer layer of LFP.

FIG. 10 shows the percentage of capacity restituted by secondary cells C and F according to the number of hours of cycling. This diagram shows that the capacity restituted by cell F is significantly greater than that restituted by cell C. Indeed, the loss of capacity by cell F is negligible after 1700 hours of cycling, whereas the loss of capacity of cell C is about 40% for the same cycling period.

It will be further noticed that the restituted capacity of cell F increases from the beginning of cycling and gradually reaches its maximum value of 110% after several training cycles (corresponding to approximately 800 hours of cycles). On the contrary, secondary cells A, B, C, D and E comprising an electrode outside the invention show a decrease in capacity restituted right from the first cycles.

Table 1 below summarizes the various capacity losses measured for secondary cells A, B, C, D, E and F after 100 hours of cycling.

TABLE 1

| Active material | Without outer layer of $LiFePO_4$ | With outer layer of $LiFePO_4$ |
|---|---|---|
| $LiMn_{1.92}Al_{0.08}O_4$ | Secondary cell B*: −1.88% (−) | Secondary cell E*: −0.25% (+) |
| $LiFe_{0.2}Mn_{0.8}PO_4$ | Secondary cell A*: −14.60% (− − −) | Secondary cell D*: −3.75% (− −) |
| 80% $LiMn_{1.92}Al_{0.08}O_4$ + 20% $LiFe_{0.2}Mn_{0.8}PO_4$ | Secondary cell C*: −2.04% (− −) | Secondary cell F**: ~0% (+ + +) |

*Outside the invention
**According to the invention

These results show the synergistic effect provided by the mixture of active materials $LiMn_{1.92}Al_{0.08}O_4$ and $LiFe_{0.2}Mn_{0.8}PO_4$ with the outer layer comprising $LiFePO_4$. Indeed, knowing firstly that secondary cell E comprising a positive electrode comprising a layer of $LiMn_{1.92}Al_{0.08}O_4$ covered with $LiFePO_4$ has a −0.25% loss of capacity and, secondly, that battery D comprising a positive electrode comprising a layer of $LiFe_{0.2}Mn_{0.8}PO_4$ covered with $LiFePO_4$ has a capacity loss of −3.75%, one would expect that a secondary cell comprising a positive electrode comprising a layer constituted of a mixture of 80% $LiMn_{1.92}Al_{0.08}O_4$ and 20% $LiFe_{0.2}Mn_{0.8}PO_4$ covered with $LiFePO_4$ has a capacity loss of between −3.75% and −0.25%. But in reality it is seen that the loss of capacity of such a secondary cell (secondary cell F) is around 0%, in other words outside the range of between −3.75% and −0.25%. This demonstrates that the use of the mixture of $LiMn_{1.92}Al_{0.08}O_4$ and 20% $LiFe_{0.2}Mn_{0.8}PO_4$ makes it possible to amplify the beneficial effect of the $LiFePO_4$ coating.

Example 4) Effect of $LiFePO_4$ Depending on Whether it is Used in Admixture with Two Other Active Materials in Layer in Contact with the Current Collector or in the Outer Layer Secondary cells having different positive electrodes and the same graphite-based negative electrode were manufactured.

Secondary cell F is as described in Example 3.

Secondary cell H differs from cell F in that the electrode does not include an $LiFePO_4$ outer layer. $LiFePO_4$ is mixed with $LiMn_{1.92}Al_{0.08}O_4$ and $LiFe_{0.2}Mn_{0.8}PO_4$ and the mixture makes it possible to form layer in contact with the current collector.

Figure 11:
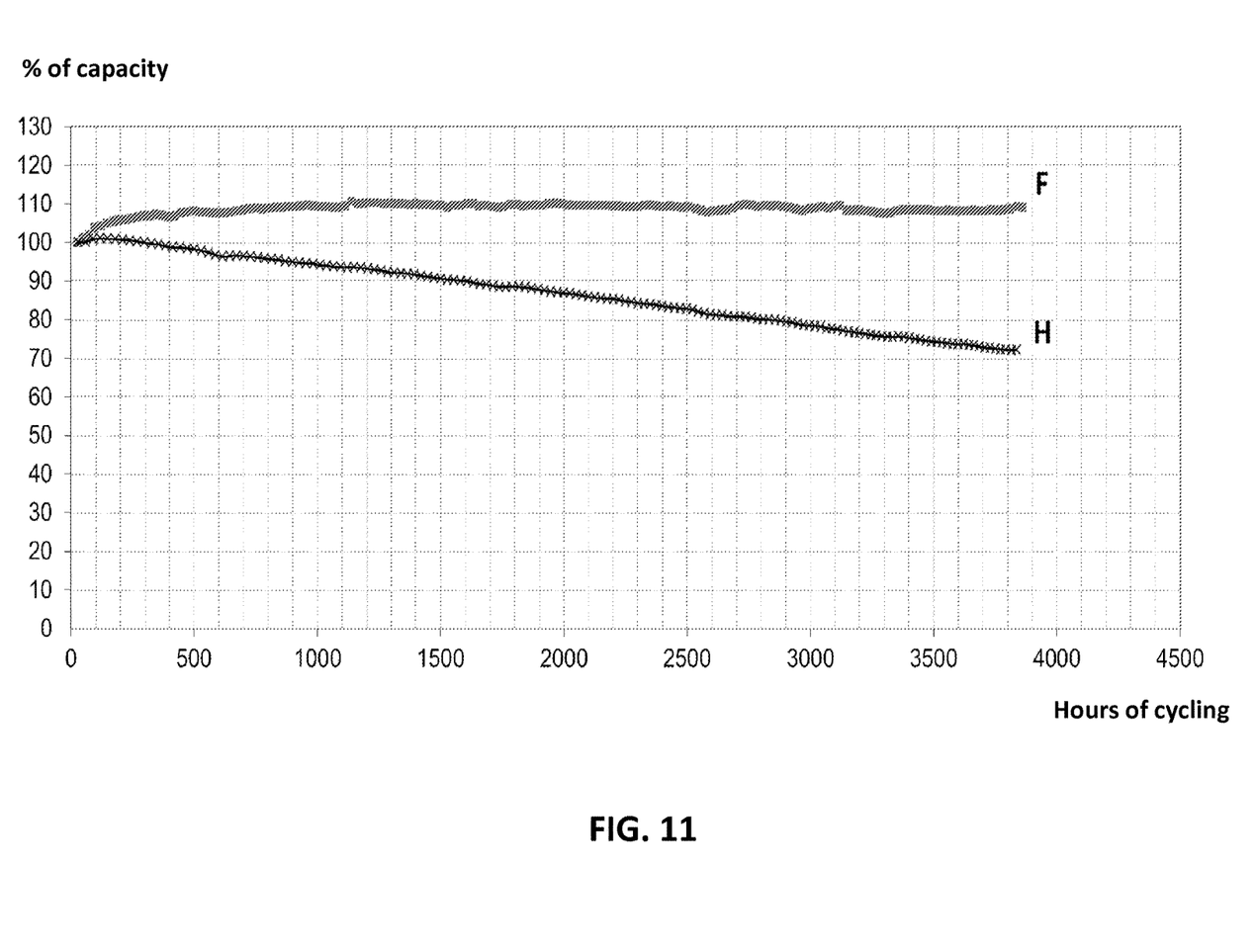
FIG. 11 shows the results of a cycling test at 40° C. of two lithium secondary cells comprising different positive electrodes and a same graphite-based negative electrode.
  F: positive electrode according to the invention comprising a first layer in which the active material is a mixture of 80% of LMO and 20% of LMP and an outer layer of LFP.
  H: positive electrode outside the invention comprising a single layer in which the active material is a mixture of LMO, LMP and LFP.

FIG. 11 shows the percentage of capacity secondary cells F and H restituted according to the number of hours of cycling. This diagram shows that the capacity restituted by cell F is significantly greater than that restituted by cell H. Indeed, the loss of capacity of cell F is negligible after 1700 hours of cycling, whereas the loss of capacity of cell H is about 10% for the same period of cycling.

A simple mixture of the three active materials $LiMn_{1.92}Al_{0.08}O_4$ and $LiFe_{0.2}Mn_{0.8}PO_4$ and $LiFePO_4$ does not achieve improved cycling lifespan to the same degree as that obtained when is $LiFePO_4$ is used in the outer layer.

Example 3 shows that when the electrode according to the invention is used as a positive electrode of a lithium cell, it has excellent lifespan under cycling. Furthermore, the electrode according to the invention also offers the following advantages:

- it allows the use of the active materials of the LMO, LFP and LMP type that have better thermal stability than the LMO2 type of active materials. Secondary cells according to the invention thus provide increased safety of use in comparison with those the positive electrode of which contains as its active material compounds of the LMO2 type.
- associating LMO with LMP makes it possible to compensate for the poor cold or room temperature performance of LMP when used alone.
- the resistivity of an electrode comprising as active material a mixture of LMO and LMP is lower than that of an electrode comprising only LMP or LFP as the active material.
- it keeps down the cost of producing a positive electrode for a lithium cell, active materials of the LMO. LMP and LFP being less expensive than those of the LMO2 type.

The invention claimed is:

1. An electrode comprising:
    a) a current collector;
    b) a stack of at least two layers disposed on at least one face of the current collector, in which:
        α) a first layer is in contact with the face of the current collector and comprises a mixture of at least two compounds chosen from:
            a compound i) of formula $Li_xMn_{1-y-z}M'_yM''_zPO_4$ where M' and M'' are selected from the group consisting of B, Mg, Al, Si, Ca, Ti, V, Cr, Fe, Co, Ni, Cu, Zn, Y, Zr, Nb and Mo; M' and M'' being different from each other; and $0.8 \le x \le 1.2$, $0 \le y \le 0.6$, $0 \le z \le 0.2$; at least one of y or z being different from 0;
            a compound ii) of formula $Li_xM_{2-x-y-z-w}M'_yM''_zM'''_wO_2$ where M, M', M'' and M''' are selected from the group consisting of B, Mg, Al, Si, Ca, Ti, V, Cr, Mn, Fe, Co, Ni, Cu, Zn, Y, Zr, Nb and Mo, provided that at least M or M' or M'' or M''' is selected from Mn, Co, Ni, or Fe; M, M', M'' and M''' being different from each other; and $0.8 \le x \le 1.4$; $0 \le y \le 0.5$; $0 \le z \le 0.5$; $0 \le w \le 0.2$ and $x+y+z+w<2$;
            a compound iii) of formula $Li_xMn_{2-y-z}M'_yM''_zO_4$ where M' and M'' are selected from the group consisting of B, Mg, Al, Si, Ca, Ti, V, Cr, Fe, Co, Ni, Cu, Zn, Y, Zr and Mo; M' and M'' being different from each other; and $1 \le x \le 1.4$; $0 \le y \le 0.6$; $0 \le z \le 0.2$;
        said mixture comprising compound i);
        β) an outer layer comprising an active material comprising at least 90% of a compound of formula $Li_xFe_{1-y}M_yPO_4$ in which M is selected from the group consisting of B, Mg, Al, Si, Ca, Ti, V, Cr, Mn, Co, Ni, Cu, Zn, Y, Zr, Nb and Mo; and $0.8 \le x \le 1.2$; $0 \le y \le 0.6$.

2. The electrode according to claim 1, comprising between the first and the outer layer, at least one intermediate layer comprising at least one compound selected from the compounds i), ii) and iii).

3. The electrode according to claim 2, wherein the intermediate layer comprises a mixture of at least two compounds selected from the compounds i), ii) and iii).

4. The electrode according to claim 1, wherein the first layer comprises a mixture of compounds i) and iii).

5. The electrode according to claim 4 wherein M' or M'' of compound i) is Fe.

6. The electrode according to claim 4, wherein y and/or z are less than 0.40.

7. The electrode according to claim 5, wherein y and/or z are less than 0.40.

8. The electrode according to claim 4, wherein M' or M'' of compound iii) is Al.

9. The electrode according to claim 8, wherein y and/or z of compound iii) are less than 0.10.

10. The electrode according to claim 4, wherein the weight percentage of compound i) is between 10% and 90% and the weight percentage of compound iii) is between 90% and 10% of the weight of the first layer.

11. The electrode according to claim 10, wherein the weight percentage of compound i) is between 10% and 30%, and the weight percentage of compound iii) is between 90% and 70% of the weight of the first layer.

12. The electrode according to claim 1, wherein the first layer further comprises a mixture of the compounds ii) and iii).

13. The electrode according to claim 1, wherein the first layer comprises a mixture of compounds i) and ii).

14. The electrode according to claim 13 wherein the weight percentage of compound i) is between 10% and 90% and the weight percentage of compound ii) is between 90% and 10% of the weight of the first layer.

15. The electrode according to claim 1, wherein the percentage by weight of the outer layer is less than 20% of the weight of the first layer, preferably less than 10%, more preferably less than 5%.

16. The electrode according to claim 1, wherein each face of the current collector is covered with a stack of said at least two layers.

17. A lithium secondary cell comprising:
   at least one positive electrode which is an electrode according to claim 1;
   at least a negative electrode comprising a material capable of intercalating and de-intercalating lithium into/from its structure.

18. A method for manufacturing an electrode comprising:
   a) providing a current collector;
   b) depositing onto at least one face of the current collector at least two layers,
      α) a first layer being in contact with the face of the current collector and comprising a mixture of at least two compounds chosen from:
         a compound i) of formula $Li_xMn_{1-y-z}M'_yM''_zPO_4$ where M' and M" are selected from the group consisting of B, Mg, Al, Si, Ca, Ti, V, Cr, Fe, Co, Ni, Cu, Zn, Y, Zr, Nb and Mo; M' and M" being different from each other; and $0.8 \leq x \leq 1.2$, $0 \leq y \leq 0.6$, $0 \leq z \leq 0.2$; at least one of y or z being different from 0:
         a compound ii) of formula $Li_xM_{2-x-y-z-w}M'_yM''_zM'''_wO_2$ where M, M', M" and M'" are selected from the group consisting of B, Mg, Al, Si, Ca, Ti, V, Cr, Mn, Fe, Co, Ni, Cu, Zn, Y, Zr, Nb and Mo, provided that at least M or M' or M" or M'" is selected from Mn, Co, Ni, or Fe; M, M', M" and M'" being different from each other; and $0.8 \leq x \leq 1.4$; $0 \leq y \leq 0.5$; $0 \leq z \leq 0.5$; $0 \leq w \leq 0.2$ and $x+y+z+w<2$;
         a compound iii) of formula $Li_xMn_{2-y-z}M'_yM''_zO_4$ where M' and M" are selected from the group consisting of B, Mg, Al, Si, Ca, Ti, V, Cr, Fe, Co, Ni, Cu, Zn, Y, Zr, Nb and Mo; M' and M" being different from each other; and $1 \leq x \leq 1.4$; $0 \leq y \leq 0.6$; $0 \leq z \leq 0.2$;
      said mixture comprising compound i);
      β) an outer layer comprising an active material comprising at least 90% of a compound of formula $Li_xFe_{1-y}M_yPO_4$ in which M is selected from the group consisting of B, Mg, Al, Si, Ca, Ti, V, Cr, Mn, Co, Ni, Cu, Zn, Y, Zr, Nb and Mo and $0.8 \leq x \leq 1.2$; $0 \leq y \leq 0.6$.

* * * * *